United States Patent Office 3,074,944
Patented Jan. 22, 1963

3,074,944
3-ALKYL-4-AMINOALKYL-2-CARBO-
CYCLICMORPHOLINES
Max J. Kalm, Skokie, and Kurt J. Rorig, Glenview, Ill., assignors to G. D. Searle & Co., Chicago, Ill., a corporation of Delaware
No Drawing. Filed Apr. 17, 1961, Ser. No. 103,268
10 Claims. (Cl. 260—247.5)

This invention relates to 3-alkyl/alkenyl-4-aminoalkyl-2-carbocyclimorpholines and processes for the manufacture thereof. More particularly, this invention relates to compounds of the formula

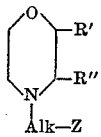

wherein R' represents a monocyclic hydrocarbon radical optionally alkylated, halogenated, hydroxylated, alkoxylated, or aminated; R" represents an alkyl or alkenyl radical; Alk represents an alkylene radical; and Z represents an optionally alkylated amino radical.

The application for Letters Patent securing the invention herein described and claimed is a continuation-in-part of applicants' prior copending application Serial No. 800,365 filed March 19, 1959, now abandoned.

Among the monocyclic hydrocarbon radicals contemplated by R' in the foregoing formula, phenyl, cyclopentyl, and cyclohexyl groupings are preferred. These groupings are commonly unsubstituted, but in selected instances advantageously comprise 1 or more halogens—for example, chlorine or bromine—or alkyl, hydroxy, alkoxy, or amino radicals replacing hydrogen. Positioning of these substituents around the carbocyclic nucleus is not critical, such various embodiments of R' as the 3 isomeric methoxy(or ethoxy)phenyl groupings, for example, being favored alike. Alkyl and alkoxy radicals best adapted to replacement of hydrogen as aforesaid are those embrasive of fewer than 8 carbon atoms, which is to say lower alkyl and lower alkoxy radicals—for example, methyl, ethyl, propyl, butyl, isobutyl, sec-butyl, tert-butyl, pentyl, isopentyl, tert-pentyl, neopentyl, hexyl, isohexyl, and heptyl radicals, and the oxygenated radicals corresponding thereto of the formula —O—lower alkyl respectively.

The alkyl and alkenyl radicals comprehended by R" in the formula are likewise most desirably of lower order, the latter being typically illustrated by vinyl, allyl, 2-butenyl, 2-methylallyl, and like $C_nH_{2n-1}$ aggregates wherein $n$ is a positive integer ranging in value from 2 through 7.

The alkylene radicals depicted by Alk are preferably of lower order also and, accordingly, will be understood by those skilled in the art to be bivalent saturated acyclic straight- or branched-chain hydrocarbon groupings of empirical formula.

—$C_mH_{2m}$— wherein $m$ is a small positive integer greater than 1. Examples of such radicals are:

1,2-ethylene (—CH₂CH₂—)

Trimethylene (—CH₂CH₂CH₂—)

1,2-propylene (—CH₂CHCH₃)

Tetramethylene (—CH₂CH₂CH₂CH₂—)

2-methyl-1,2-propylene (—CH₂ĊCH₃)
|
CH₃

2,4-pentylene (CH₃ĊHCH₂ĊHCH₃)

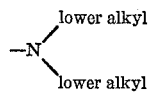

3-methyl-1,4-butylene (—CH₂CH₂CHCH₂—)
|
CH₃

Hexamethylene (—CH₂CH₂CH₂CH₂CH₂CH₂—)

etc.

Z in the generic formula for compounds of this invention subsumes both the amino radical, —NH₂, and the amino radical as modified by introduction of 1 or 2 alkyl radicals—especially lower alkyl radicals. In the latter circumstance, the alkyl groupings present may either be discrete, as when Z designates a radical of the formula $$-N\begin{matrix}\text{lower alkyl}\\\text{lower alkyl}\end{matrix}$$

or they may be joined toegther directly or through oxygen or a second nitrogen to compose cyclic amino radicals optimally comprising at least 4 and not more than 7 carbon atoms arranged to form 5- and 6-membered heterocycles, particularly those in which oxygen or the second nitrogen (which can be substituted by a lower alkyl grouping) is para to the nitrogen attached to the radical represented by Alk, as in the piperazino and morpholino moieties. Illustrative of cyclic amino radicals contemplated by Z, in addition to the piperazino and morpholino groupings named above, are pyrrolidino, 2-methylpyrrolidino, 2,5-dimethylpyrrolidino, 2,2,4-trimethylpyrrolidino, 3-methyl-4-ethylpyrrolidino, piperidino, 3-methylpiperidino, 2,6-dimethylpiperidino, 2-methyl-5-ethylpiperidino, 4-methylpiperazino, 4-ethylpiperazino, etc. It will be readily recognized that the -inosuffix indicates attachment of the described radicals via nitrogen.

It follows from the above that heterocyclic radicals of the formula

wherein the alkylene constituent (which can be branched or straight-chain) is such as to give rise to 5- and 6-membered rings and can be interrupted by oxygen or a second nitrogen as in

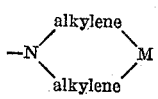

in which the alkylene radicals separate the groups attached thereto by 2 carbon atoms and M represents nitrogen or oxygen, are valuable expressions of Z; and, optimally but not exclusively, Z represents one of the following radicals

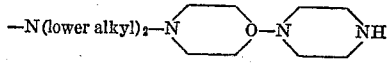

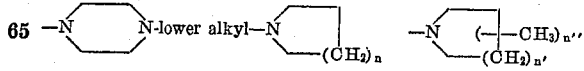

$n$ and $n'$ being positive integers less than 3 and $n''$ being a positive integer less than 4.

Equivalent to the hereinabove-described amines for purposes of the present invention are their non-toxic acid addition salts, the composition of which is depicted by

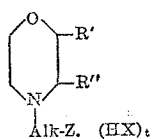

wherein R', R", Alk, and Z have the meanings previously assigned; X is one equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in physiological dosage; and $t$ is 1 or 2 except when Z comprises 2 nitrogen atoms, in which case it is 1, 2, or 3.

The compounds to which this invention relates are useful because of their valuable pharmacological properties. For example, they are eurhythmic agents and, moreover, characterized by selective central nervous system effects—particularly barbiturate-potentiating activity.

The subject compounds can be variously manufactured, but a preferred procedure comprises heating an appropriate ethanolamine of the formula

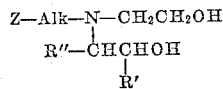

in aqueous hydrobromic acid. Alternatively, manufacture proceeds by heating together an appropriate morpholine

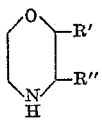

and haloalkylamine

in the presence of an acid acceptor such as a tri(lower alkyl)amine or an alkali carbonate, hydroxide, or amide, with a solvent of the type ethanol, butanone, toluene, or formamide as the reaction medium. As a variation of the latter procedure, one can heat an appropriate haloalkylmorpholine

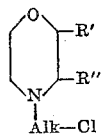

with a selected amine

in especially a ketonic solvent to produce the disclosed products. The meanings of R', R", Alk, and Z throughout the foregoing representation of preparative methods are as previously set forth.

Conversion of the amine bases of this invention to corresponding acid addition salts is accomplished by simple admixture of these compounds with from 1 to 3 equivalents of any of various inorganic and strong organic acids, the anionic portion of which conforms to X as hereinabove defined.

The following examples describe in detail compounds illustrative of the present invention and the methods which have been devised for their manufacture. However, the invention is not to be construed as limited thereby, either in spirit or scope, since it will be apparent to those skilled in the art of organic synthesis that many modifications, both of materials and methods, may be practiced without departing from the purpose and intent of this disclosure. Throughout the examples hereinafter set forth, temperatures are given in degrees centigrade and relative amounts of materials in parts by weight, except as otherwise noted.

*Example 1*

3 - methyl - 4 - (2 - dimethylaminoethyl) - 2 - phenylmorpholine dihydrobromide.—A mixture of 531 parts of 3-methyl-2-phenylmorpholine, 432 parts of 2-dimethylaminoethyl chloride hydrochloride, and 360 parts of anhydrous powdered sodium carbonate in approximately 4000 parts of alcohol is heated at the boiling point under reflux with agitation for 25 hours. The mixture is thereupon cooled, filtered, and stripped of solvent by vacuum distillation, in that order. The residue is taken up in excess dilute hydrochloric acid, and this solution is washed free of neutral impurities with ether and then made alkaline with aqueous sodium hydroxide. The resultant mixture is extracted with ether; and the ether extract, in turn, is dried over anhydrous potassium carbonate and then freed of solvent by evaporation. The residue is the free base, 3-methyl-4-(2-dimethylaminoethyl)-2-phenylmorpholine. Conversion of the base to the corresponding dihydrobromic acid salt is accomplished by dissolution of the base in a small amount of absolute alcohol and mixing therewith sufficient hydrogen bromide dissolved in absolute alcohol to produce substantial acidity. The 3-methyl-4-(2-dimethylaminoethyl)-2-phenylmorpholine dihydrobromide which results is thrown out of solution by addition of excess anhydrous ether. The product is a white crystalline solid melting at 244–246° (with decomposition). It has the formula

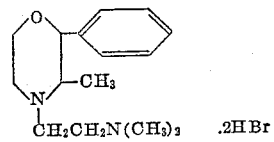

*Example 2*

3 - methyl - 4 - (3 - dimethylaminopropyl) - 2 - phenylmorpholine dihydrobromide.—A mixture of 531 parts of 3-methyl-2-phenylmorpholine, 474 parts of 3-dimethylaminopropyl chloride hydrochloride, and 360 parts of anhydrous powdered sodium carbonate in approximately 4000 parts of alcohol is heated at the boiling point under reflux with agitation for 51 hours. Work-up in accordance with the procedure described in Example 1 affords the free base, 3-methyl-4-(3-dimethylaminopropyl)-2-phenylmorpholine, which, taken into absolute alcohol and mixed with an excess of anhydrous alcoholic hydrogen bromide as detailed in Example 1, affords 3-methyl-4 - (3 - dimethylaminopropyl) - 2 -phenylmorpholine dihydrobromide. The product is thrown out of solution with anhydrous ether as a white solid melting at approximately 244–245° (with decomposition). It has the formula

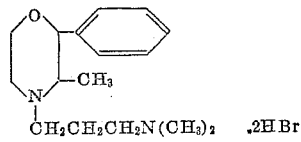

*Example 3*

4 - (2 - diethylaminoethyl) - 3 - methyl - 2 - phenylmorpholine dihydrobromide.—A mixture of 531 parts of 3-methyl-2-phenylmorpholine, 406 parts of 2-diethylaminoethyl chloride, and 180 parts of anhydrous powdered sodium carbonate in approximately 4000 parts of alcohol is heated at the boiling point under reflux with agitation for 48 hours. Work-up in accordance with the procedure described in Example 1 affords the free base, 4 - (2 -diethylaminoethyl) - 3 -methyl - 2 - phenylmorpholine, as a yellow oil which, taken into absolute alcohol and mixed with an excess of anhydrous alcoholic hydrogen bromide as detailed in Example 1, affords 4- (2 - diethylaminoethyl) - 3 - methyl - 2 - phenylmorpholine dihydrobromide. The product is thrown out of solution with anhydrous ether as a white solid melting at 235–237° (with effervescence). It has the formula

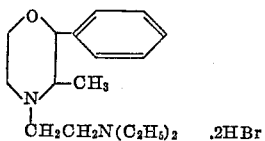

Example 4

*4 - (3 - diethylaminopropyl) - 3 - methyl - 2 - phenylmorpholine dihydrobromide.*—A mixture of 531 parts of 3-methyl-2-phenylmorpholine, 558 parts of 3-diethylaminopropyl chloride hydrochloride, and 360 parts of anhydrous powdered sodium carbonate in approximately 4000 parts of alcohol is heated at the boiling point under reflux with agitation for 67 hours. Work-up in accordance with the procedure described in Example 1 affords the free base, 4-(3-diethylaminopropyl)-3-methyl-2-phenylmorpholine, as a light yellow oil which, taken into absolute alcohol and mixed with an excess of anhydrous alcoholic hydrogen bromide as detailed in Example 1, affords 4-(3-diethylaminopropyl)-3-methyl-2-phenylmorpholine dihydrobromide. The product is thrown out of solution with anhydrous ether as a white solid melting at 224–227° (with decomposition). It has the formula

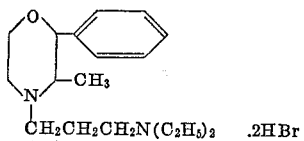

Example 5

*4 - (2 - diisopropylaminoethyl) - 3 - methyl - 2 - phenylmorpholine dihydrobromide.*—A mixture of 531 parts of 3-methyl-2-phenylmorpholine, 600 parts of 2-diisopropylaminoethyl chloride hydrochloride, and 360 parts of anhydrous powdered sodium carbonate in approximately 4000 parts of alcohol is heated at the boiling point under reflux with agitation for 67 hours. Work-up in accordance with the procedure described in Example 1 affords the free base, 4-(2-diisopropylaminoethyl)-3-methyl-2-phenylmorpholine, as a colorless oil which, taken into absolute alcohol and mixed with an excess of anhydrous alcoholic hydrogen bromide as detailed in Example 1, affords 4 - (2-diisopropylaminoethyl)-3-methyl-2-phenylmorpholine dihydrobromide. The product is thrown out of solution as a white solid melting at approximately 238–239° (with effervescence). It has the formula

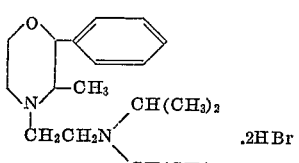

Example 6

*3 - methyl - 2 - phenyl - 4 - (2 - pyrrolidinoethyl)morpholine dihydrobromide.*—A mixture of 531 parts of 3-methyl-2-phenylmorpholine, 406 parts of 2-pyrrolidinoethyl chloride, and 180 parts of anhydrous powdered sodium carbonate in approximately 4000 parts of alcohol is heated at the boiling point under reflux with agitation for 24 hours. Work-up in accordance with the procedure described in Example 1 affords the free base, 3 - methyl - 2 - phenyl - 4 - (2 - pyrrodylidinoethyl)morpholine, which, taken into absolute alcohol and mixed with an excess of anhydrous alcoholic hydrogen bromide as detailed in Example 1, affords 3-methyl-2-phenyl-4-(2 - pyrrolidinoethyl)morpholine dihydrobromide. The product is thrown out of solution with anhydrous ether as a white solid melting at 259–261° (with decomposition). It has the formula

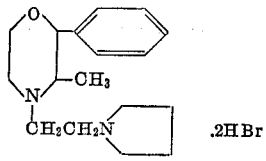

Example 7

*3 - methyl - 4 - [2 - (2,5 - dimethylpyrrolidino)ethyl]-2-phenylmorpholine dihydrobromide.*—A mixture of 531 parts of 3-methyl-2-phenylmorpholine, 594 parts of 2-(2,5-dimethylpyrrolidino)ethyl chloride hydrochloride, and 360 parts of anhydrous powdered sodium carbonate in approximately 4000 parts of alcohol is heated at the boiling point under reflux with agitation for 48 hours. Work-up in accordance with the procedure described in Example 1 affords the free base, 3-methyl-4-[2-(2,5-dimethylpyrrolidino)ethyl]-2-phenylmorpholine, as a light green oil which, taken into absolute alcohol and mixed with an excess of anhydrous alcoholic hydrogen bromide as detailed in Example 1, affords 3-methyl-2-phenyl-4-[2-(2,5 - dimethylpyrrolidino)ethyl] - 2 - phenylmorpholine dihydrobromide. The product is thrown out of solution with anhydrous ether as a white solid melting at approximately 260.5–261.5° (with decomposition). It has the formula

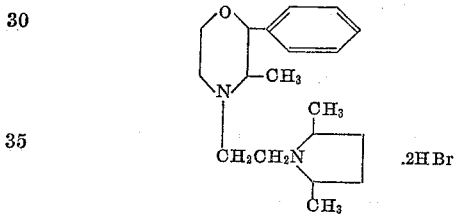

Example 8

*2 - (p - methoxyphenyl) - 3 - methyl - 4 - (2 - pyrrolidinoethyl)morpholine dihydrochloride.*—A mixture of 620 parts of 2-(p-methoxyphenyl)-3-methylmorpholine, 406 parts of 2-pyrrolidinoethyl chloride, 318 parts of anhydrous powdered sodium carbonate in approximately 4000 parts of alcohol is heated at the boiling point under reflux for 65 hours. Work-up in accordance with the procedure described in Example 1 affords the free base, 2-(p-methoxyphenyl)-3-methyl-4-(2-pyrrolidinoethyl)morpholine. Conversion of the base to the corresponding dihydrochloric acid salt is accomplished by dissolution of the base in absolute alcohol and mixing therewith sufficient hydrogen chloride dissolved in absolute isopropyl alcohol to produce substantial acidity. The desired 2-(p-methoxyphenyl)-3-methyl-4-(2-pyrrolidinoethyl)morpholine dihydrochloride crystallizes from solution as a white solid melting at approximately 267–267.5°. The product has the formula

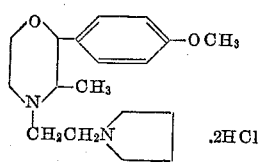

Example 9

A. *2 - {N - (2 - hydroxyethyl) - N - [2 - (2,6 - dimethylpiperidino)ethyl]amino} - 1 - phenylpropanol.*—A mixture of 975 parts of 2-(2-hydroxyethylamino)-1-phenylpropanol, 1060 parts of 2-(2,6-dimethylpiperidino)ethyl chloride hydrochloride, and 600 parts of anhydrous powdered sodium carbonate in approximately 8000 parts of alcohol is heated at the boiling point under reflux with agitation for 66 hours. Work-up in accordance with the procedure described in Example 1 affords the free base, 2 - {N - (2 - hydroxyethyl) - N - [2 - (2,6 - dimethylpiperidino)ethyl]amino}-1-phenylpropanol, as a light yellow oil.

B. *3-methyl - 4 - [2-(2,5-dimethylpiperidino)ethyl]-2-phenylmorpholine dihydrobromide.*—A solution of 125 parts of 2-{N-(2-hydroxyethyl) - N - [2 - (2,6-dimethylpiperidino)ethyl]amino}-1-phenylpropanol in 1500 parts of aqueous 48% hydrogen bromide is heated at the boiling point under reflux with agitation for 1½ hours. The bulk of the hydrogen bromide and water is then distilled off in vacuo and the residue is made alkaline with aqueous sodium hydroxide. The resultant mixture is extracted with ether; and the ether extract, in turn, is dried over anhydrous potassium carbonate in the presence of decolorizing charcoal. The resultant mixture is filtered and the filtrate is freed of solvent by evaporation. The greenyellow oil thus obtained is the free base, 3-methyl-4-[2-(2,5 - dimethylpiperidino)ethyl] - 2 - phenylmorpholine. Conversion of the base to the corresponding dihydrobromic acid salt is accomplished by dissolution of the base in absolute alcohol and mixing therewith sufficient hydrogen bromide dissolved in absolute alcohol to produce substantial acidity. Addition of anhydrous ether causes precipitation of the desired 3-methyl-4-[2-(2,5-dimethylpiperidino)ethyl]-2-phenylmorpholine dihydrobromide as a white crystalline solid melting at 238–240.5° (with decomposition). It has the formula

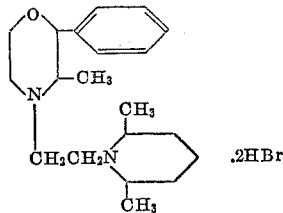

Example 10

A. *4-(2-chloroethyl)-3-methyl-2-phenylmorpholine hydrochloride.*—To a solution of 16 parts of 4-(2-hydroxyethyl)-3-methyl-2-phenylmorpholine in 16 parts of absolute alcohol is added a slight excess of hydrogen chloride dissolved in isopropyl alcohol. After thorough mixing, sufficient ether is added to cause the resultant acid salt to oil out. Solvents are then decanted from the oil, which is thereupon taken up in 150 parts of chloroform. The chloroform solution is mixed with approximately 18 parts of thionyl chloride and heated at the boiling point under reflux for 4½ hours. Excess thionyl chloride and chloroform is then removed by vacuum distillation. An additional 80 parts of chloroform is mixed with the residue and again distilled off in vacuo to assure complete removal of the thionyl chloride. The reddish brown residual oil is the desired 4-(2-chloroethyl)-3-methyl-2-phenylmorpholine hydrochloride, which crystallizes on standing.

B. *3-methyl-2-phenyl - 4 - (2-piperazinoethyl)-morpholine trihydrobromide.*—A mixture of 828 parts of 4-(2-chloroethyl)-3-methyl-2-phenylmorpholine hydrochloride and 775 parts of piperazine in 8000 parts of butanone is heated at the boiling point under reflux with agitation for 12 hours. Solvent is then removed by distillation at reduced pressures, and the residue is taken up in 5000 parts of water. The aqueous solution is made alkaline with aqueous sodium hydroxide, and the resultant mixture is extracted with ether. The ether extract, in turn, is dried over anhydrous potassium carbonate and then freed of solvent by evaporation. The yellow oil which remains is the free base, 3-methyl-2-phenyl-4-(2-piperazinoethyl)morpholine. Conversion of this base to the corresponding trihydrobromic acid salt is accomplished by dissolution of the base in absolute alcohol and mixing therewith sufficient hydrogen bromide dissolved in absolute alcohol to produce substantial acidity. The 3-methyl-2-phenyl-4-(2-piperazinoethyl)morpholine trihydrobromide which results is precipitated with an excess of anhydrous ether. The product has the formula

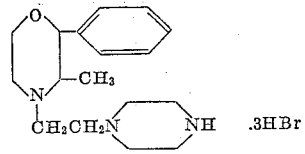

Example 11

*3-methyl-4-(2-morpholinoethyl) - 2 - phenylmorpholine dihydrobromide.*—A mixture of 531 parts of 3-methyl-2-phenylmorpholine, 558 parts of 2-morpholinoethyl chloride hydrochloride, and 360 parts of anhydrous powdered sodium carbonate in approximately 4000 parts of alcohol is heated at the boiling point under reflux with agitation for 65 hours. Work-up in accordance with the procedure described in Example 1 affords the free base, 3-methyl - 4 - (2-morpholinoethyl) - 2 - phenylmorpholine, which, taken into absolute alcohol and mixed with an excess of anhydrous alcoholic hydrogen bromide as detailed in Example 1, affords 3-methyl-4-(2-morpholinoethyl)-2-phenylmorpholine dihydrobromide. The product is thrown out of solution with anhydrous ether as a white solid melting at approximately 261–262° (with decomposition). It has the formula

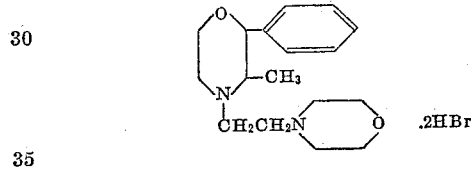

Example 12

A. *2-cyclohexyl-3-methylmorpholine.*—A solution of approximately 63 parts of 3-methyl-2-phenylmorpholine in 500 parts of glacial acetic acid is hydrogenated at room temperatures and pressures of the order of 1000 pounds per square inch, using 6 parts of 5% rhodium-on-alumina as catalyst. When the uptake of hydrogen indicates that reduction of the phenyl ring is complete (representatively, after 6½ hours), the catalyst is filtered out and the filtrate is stripped of solvent by vacuum distillation. The residue is taken up in 200 parts of water, and this solution is neutralized with solid potassium carbonate. The resultant mixture is extracted with ether, and the ether extract is dried over anhydrous potassium carbonate and freed of solvent by evaporation. Distillation of the residue, in vacuo, affords 2-cyclohexyl-3-methylmorpholine boiling at approximately 70–71° under 0.8 mm. pressure. The product has an index of refraction, referred to sodium D at 25°, of 1.4857.

B. *2-cyclohexyl - 4 - (2-diethylaminopropyl)-3-methylmorpholine and 2-cyclohexyl-3-methyl-4-(1-methyl-2-diethylaminoethyl)morpholine.*—A mixture of 11 parts of 2-cyclohexyl-3-methylmorpholine, approximately 11 parts of 2-diethylaminopropyl chloride hydrochloride, and 7 parts of anhydrous powdered sodium carbonate in approximately 80 parts of alcohol is heated at the boiling point under reflux with agitation for 48 hours. Work-up in accordance with the procedure described in Example 1 affords a mixture of 2-cyclohexyl-4-(2-diethylaminopropyl)-3-methylmorpholine and 2-cyclohexyl-3-methyl-4-(1 - methyl - 2 - diethylaminoethyl)morpholine, which can be enformulated

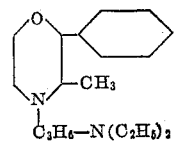

Example 13

*2-cyclohexyl-3-methyl-4-[2-(2,5 - dimethylpyrrolidino) ethyl]morpholine dihydrobromide.*—A mixture of 550 parts of 2-cyclohexyl-3-methylmorpholine, 594 parts of 2-(2,5-dimethylpyrrolidino)ethyl chloride hydrochloride, and 360 parts of anhydrous powdered sodium carbonate in approximately 4000 parts of alcohol is heated at the boiling point under reflux with agitation for 40 hours. Work-up in accordance with the procedure described in Example 1 affords the free base, 2-cyclohexyl-3-methyl-4 - [2,(2,5 - dimethylpyrrolidino)ethyl]morpholine, as a light green oil which, taken into absolute alcohol and mixed with an excess of anhydrous alcoholic hydrogen bromide as detailed in Example 1, affords 2-cyclohexyl-3-methyl-4-[2 - (2,5 - dimethylpyrrolidino)ethyl]morpholine dihydrobromide. The product is thrown out of solution with anhydrous ether as a white solid melting at approximately 260–261°. It has the formula

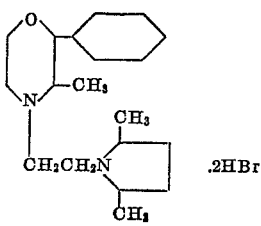

Example 14

*2-cyclohexyl-3-methyl-4-[3 - (2,6 - dimethylpiperidino) propyl]morpholine.*—A mixture of 550 parts of 2-cyclohexyl-3-methylmorpholine, 677 parts of 3-(2,6-dimethylpiperidino)propyl chloride hydrochloride, and 360 parts of anhydrous powdered sodium carbonate in approximately 4000 parts of alcohol is heated at the boiling point under reflux with agitation for 48 hours. Work-up in accordance with the procedure described in Example 1 affords the free base, 2-cyclohexyl-3-methyl-4[3-(2,6-dimethylpiperidino)propyl]morpholine, which has the formula

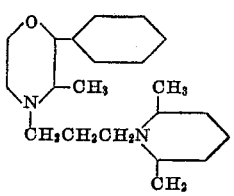

Example 15

A. *2-cyclohexyl-4-(5-hydroxypentyl) - 3 - methyl-morpholine.*—A mixture of 183 parts of 2-cyclohexyl-3-methylmorpholine, 146 parts of 5-chloropentanol, and 133 parts of anhydrous powdered sodium carbonate in approximately 8000 parts of alcohol is heated at the boiling point under reflux with agitation for 24 hours. The mixture is thereupon cooled, filtered, and stripped of solvent by vacuum distillation, in that order. The residue is taken up in excess aqueous hydrochloric acid, and this solution is washed free of neutral impurities with ether and then made alkaline with aqueous sodium hydroxide. The resultant mixture is extracted with ether; and the ether extract, in turn, is dried over anhydrous potassium carbonate and then freed of solvent by evaporation. The residue is the free base, 2-cyclohexyl-4-(5-hydroxypentyl)-3-methylmorpholine.

B. *4-(5-chloropentyl)-2-cyclohexyl-3 - methylmorpholine hydrochloride.*—A solution of 16 parts of 2-cyclohexyl-4-(5 - hydroxypentyl) - 3 - methylmorpholine in 16 parts of absolute alcohol is made slightly acid with hydrogen chloride dissolved in isopropyl alcohol. The acid addition salt which results is thrown out of solution by introduction of approximately 140 parts of ether. Ether and the alcohols present are decanted, and the salt is taken up in 150 parts of chloroform. The chloroform solution is mixed with approximately 14 parts of thionyl chloride and thereupon heated at the boiling point under reflux for 4½ hours, at the end of which time chloroform and excess thionyl chloride are removed by vacuum distillation. An additional 150 parts of chloroform is added to the residue and distilled off to insure that removal of the thionyl chloride is complete. The dark viscous residue is the desired 4-(5-chloropentyl)-2-cyclohexyl-3-methylmorpholine hydrochloride.

C. *2-cyclohexyl-3-methyl-4-(5 - piperazinopentyl)morpholine.*—A mixture of 971 parts of 4-(5-chloropentyl)-2 - cyclohexyl - 3 - methylmorpholine hydrochloride, 775 parts of piperazine, and 8000 parts of butanone is heated at the boiling point under reflux with agitation for 12 hours. The solvent is then removed by vacuum distillation and the residue is mixed with approximately 5000 parts of excess aqueous alkali. The resultant mixture is extracted with ether, and the ether extract is dried over anhydrous potassium carbonate and stripped of solvent by distillation. The residue is the desired 2-cyclohexyl-3-methyl-4-(5-piperazinopentyl)morpholine, of the formula

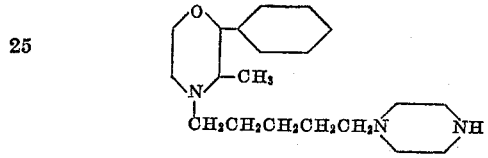

Example 16

*2-cyclohexyl-3-methyl-4-(2 - morpholinoethyl)morpholine dihydrochloride.*—A mixture of 550 parts 2-cyclohexyl-3-methylmorpholine, 558 parts of 2-morpholinoethyl chloride hydrochloride, and 360 parts of anhydrous powdered sodium carbonate in approximately 4000 parts of alcohol is heated at the boiling point under reflux with agitation for 68 hours. Work-up in accordance with the procedure described in Example 1 affords the free base, 2-cyclohexyl-3-methyl-4-(2-morpholinoethyl)morpholine, which, taken into absolute alcohol and mixed with an excess of anhydrous isopropanolic hydrogen chloride as detailed in Example 8, affords 2-cyclohexyl-3-methyl-4-(2 - morpholinoethyl)morpholine dihydrochloride. The product is thrown out of solution with anhydrous ether as a white solid melting at 272.5–274° (with decomposition). It has the formula

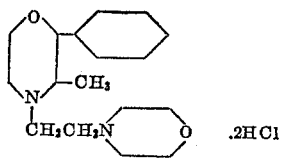

What is claimed is:
1. A compound of the formula

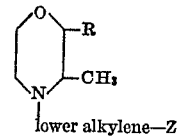

wherein
(a) R represents a member of the class consisting of radicals of the formulas

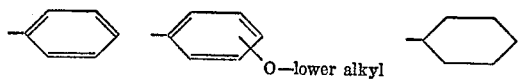

(b) the lower alkylene radical represented separates the groups attached thereto by at least 2 carbon atoms and (c) Z represents a member of the class consisting of radicals of the formulas

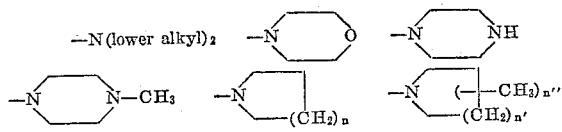

n and n' being positive integers less than 3 and n'' being a positive integer less than 4.

2. A compound of the formula

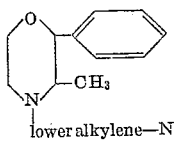

wherein the lower alkylene radical represented separates the groups attached thereto by at least 2 carbon atoms.

3. A compound of the formula

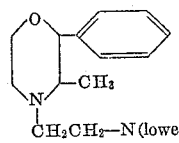

4. 4-(2-diethylaminoethyl)-3-methyl-2 - phenylmorpholine.

5. 3-methyl-4-(2-dimethylaminoethyl) - 2 - phenylmorpholine.

6. A compound of the formula

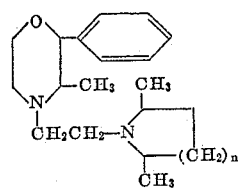

wherein $n$ is a positive integer less than 3.

7. 3-methyl - 4 - [2 - (2,5 - dimethylpyrrolidino)ethyl]-phenylmorpholine.

8. 3-methyl-4-(2-morpholinoethyl) - 2 - phenylmorpholine.

9. A compound of the formula

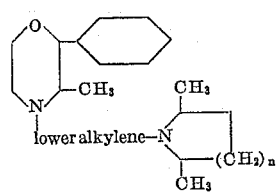

wherein the lower alkylene radical separates the groups attached thereto by at least 2 carbon atoms and $n$ is a positive integer less than 3.

10. 2-cyclohexyl-3-methyl-4 - (2-morpholinoethyl)morpholine.

No references cited.

UNITED STATES PATENT OFFICE
CERTIFICATE OF CORRECTION

Patent No. 3,074,944

January 22, 1963

Max J. Kalm et al.

It is hereby certified that error appears in the above numbered patent requiring correction and that the said Letters Patent should read as corrected below.

Column 1, line 11, for "2-carbocyclimorpholines" read -- 2-carbocyclicmorpholines --; column 2, line 23, for "toegther" read -- together --; line 39, for "-inosuffix" read -- -ino suffix --; same column 2, lines 61 to 66, the last group of formulas should appear as shown below instead of as in the patent:

-N(lower alkyl)$_2$   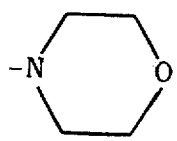   

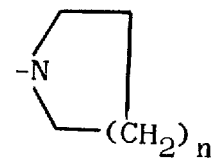   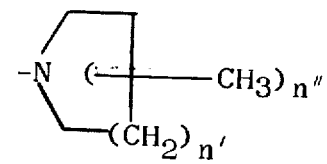

column 7, line 57, for "(2-piperazinoethyl)-morpho-", in italics, read -- (2-piperazinoethyl)morpho- --, in italics; column 9, line 2, for "(2,5-dimethylpyrrolidino)", in italics, read -- (2,5-dimethylpyrrolidino)- --, in italics; line 11, for "4-[2,(2,5-" read -- 4-[2-(2,5- --; line 31, for "(2,6-dimethylpiperidino)", in italics, read -- (2,6-dimethylpiperidino) - --, in italics; lines 42 to 50, the lower portion of the formula should appear as shown below instead of as in the patent:

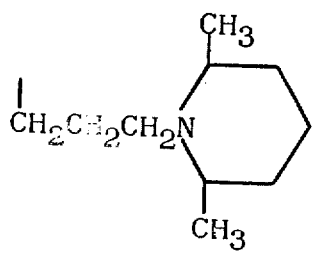

3,074,944 same column 9, line 52, for "-3-methyl-mor-", in italics, read -- -3-methylmor- --, in italics.

Signed and sealed this 25th day of February 1964.

(SEAL)
Attest:

ERNEST W. SWIDER
Attesting Officer

EDWIN L. REYNOLDS
Acting Commissioner of Patents